United States Patent
Noles, Jr. et al.

(10) Patent No.: US 9,914,867 B2
(45) Date of Patent: Mar. 13, 2018

(54) COMPLETION FLUID FRICTION REDUCER

(71) Applicant: Noles Intellectual Properties, LLC, Washington, OK (US)

(72) Inventors: Jerry W. Noles, Jr., Blanchard, OK (US); Alex J. Watts, Rayville, LA (US)

(73) Assignee: Noles Intellectual Properties, LLC, Washington, OK (US)

( * ) Notice: Subject to any disclaimer, the term of this patent is extended or adjusted under 35 U.S.C. 154(b) by 0 days.

(21) Appl. No.: 15/045,001

(22) Filed: Feb. 16, 2016

(65) Prior Publication Data
US 2017/0233627 A1   Aug. 17, 2017

(51) Int. Cl.
| C09K 8/035 | (2006.01) |
| E21B 7/04 | (2006.01) |
| E21B 41/00 | (2006.01) |
| C10M 105/24 | (2006.01) |
| C10M 145/38 | (2006.01) |
| C10M 129/70 | (2006.01) |

(52) U.S. Cl.
CPC ........... *C09K 8/035* (2013.01); *C10M 105/24* (2013.01); *C10M 129/70* (2013.01); *C10M 145/38* (2013.01); *E21B 7/046* (2013.01); *E21B 41/00* (2013.01); *C09K 2208/34* (2013.01); *C10M 2207/183* (2013.01); *C10M 2207/281* (2013.01); *C10M 2209/109* (2013.01)

(58) Field of Classification Search
None
See application file for complete search history.

(56) References Cited

U.S. PATENT DOCUMENTS

| 4,614,235 | A | * | 9/1986 | Keener | C09K 8/02 166/301 |
| 4,964,615 | A | * | 10/1990 | Mueller | C09K 8/02 166/301 |
| 5,499,677 | A | * | 3/1996 | Cowan | C04B 28/08 106/790 |
| 5,807,810 | A | * | 9/1998 | Blezard | C09K 5/08 507/103 |
| 6,302,209 | B1 | * | 10/2001 | Thompson, Sr. | B01F 17/0028 166/305.1 |
| 6,489,272 | B2 | * | 12/2002 | Gatlin | C09K 8/035 507/239 |
| 9,505,970 | B2 | * | 11/2016 | Vaughn | C09K 8/602 |
| 2001/0006935 | A1 | * | 7/2001 | Gatlin | C09K 8/035 508/452 |
| 2003/0188864 | A1 | * | 10/2003 | Boudreau | C09K 3/32 166/270.1 |
| 2007/0207933 | A1 | * | 9/2007 | McMechan | C09K 8/882 507/224 |
| 2011/0036579 | A1 | * | 2/2011 | Xiang | C09K 8/22 166/305.1 |

(Continued)

*Primary Examiner* — Anuradha Ahuja
(74) *Attorney, Agent, or Firm* — Ramey & Schwaller, LLP

(57) ABSTRACT

A method and composition for reducing a coefficient of friction are disclosed. In an embodiment, a method for reducing a coefficient of friction between two surfaces in a borehole includes preparing a mixture comprising a primary lubricating agent, a primary surfactant, a spreading agent, and an aqueous fluid. The method also includes pumping the mixture into the borehole such that the mixture contacts the two surfaces and reduces the coefficient of friction for the two surfaces.

16 Claims, 3 Drawing Sheets

(56) References Cited

U.S. PATENT DOCUMENTS

| | | | | |
|---|---|---|---|---|
| 2011/0056694 A1* | 3/2011 | Sears | .................... | C09K 8/524 |
| | | | | 166/312 |
| 2011/0306524 A1* | 12/2011 | Smith | ................... | C09K 8/035 |
| | | | | 507/136 |
| 2012/0302468 A1* | 11/2012 | Falana | ..................... | C09K 8/08 |
| | | | | 507/110 |
| 2013/0130942 A1* | 5/2013 | Dobson, Jr. | .............. | C09K 8/06 |
| | | | | 507/116 |
| 2013/0327594 A1* | 12/2013 | Raczkowski | ........ | C10M 129/70 |
| | | | | 184/6 |
| 2014/0296185 A1* | 10/2014 | Jones | .................... | C09K 8/035 |
| | | | | 514/75 |
| 2015/0166866 A1* | 6/2015 | Dobson, Jr. | .............. | C09K 8/06 |
| | | | | 175/65 |
| 2015/0218433 A1* | 8/2015 | Nguyen | ................ | C09K 8/035 |
| | | | | 175/65 |
| 2015/0252622 A1* | 9/2015 | Gayral Chirac | ......... | C09K 8/08 |
| | | | | 175/65 |
| 2015/0353806 A1* | 12/2015 | Delorme | ................. | C09K 8/08 |
| | | | | 507/136 |

* cited by examiner

COMPLETION FLUID FRICTION REDUCER

BACKGROUND

Field of the Invention

This invention relates to the field of completion fluids for drilling applications, and more particularly to the field of reducing the friction between similar or dissimilar surfaces using an aqueous-based completion fluid disposed between the similar or dissimilar surfaces.

Background of the Invention

Drilling horizontally within an oil and gas reservoir can potentially produce a more productive well, because a horizontal well may allow for access to larger areas of an oil- and gas-bearing formation. As such, the longer the horizontal section of the well, the more productive the well may be. For this reason, it has become increasingly common to drill horizontally in many oil- and gas-bearing formations as well as utility and mining applications.

Increasing the length of the horizontal section of a borehole may be difficult when the length of the horizontal section surpasses the length of the vertical section. Further, the insertion of conduits, such as a drill pipe, may become increasingly difficult as the horizontal section is lengthened. For example, as the drill pipe is pushed further into the borehole, the amount of contact between it and other surfaces increases, and thus so would the amount of friction between the drill pipe and the other surfaces. Thus, the ability to push or rotate the drill pipe in the wellbore may become limited as the friction increases. Friction may also be present between a conduit and wellbore tools/wellbore materials inserted into the conduit. For example, wires or cables may be pushed or pulled into a conduit only so long as the amount of friction between the wires/cables and the conduit is low enough to allow for the wires/cables to be pushed or pulled. As discussed above, friction between two similar or dissimilar surfaces may increase faster in horizontal sections of a conduit relative to vertical sections of the conduit.

A specific example of the difficulty of drilling a horizontal section may be illustrated by the process of drilling bridge plugs from the casing. The drilling of bridge plugs is often performed with a fluid motor and bit on the end of a section of coiled tubing. An aqueous-based fluid may be pumped down the tubing, through the motor and bit, and back up the annulus inside the casing. The friction between a section of coiled tubing and the casing in the horizontal section of the borehole may become equal to the force available to move the coiled tubing along the horizontal section, at which point further drilling may not be possible.

As discussed, one method of reducing friction in oil, gas, and mining operations is to push a conduit with a mechanism that would drive the conduit into the borehole or well. This pushing may be accomplished by any mechanism that is capable of delivering a sufficient amount of force to the conduit such that the conduit is pushed into the borehole. This may be referred to as "snubbing the pipe." In utility boring or mining operations, cables may be attached to the drill string to pull the conduits into or out of the borehole so as to overcome the friction between the conduit and the borehole. Further, in some horizontal drilling applications, rotating the conduit at a high enough RPM may reduce the amount of frictional contact between the conduit and any surfaces it contacts. This is commonly done during drilling and boring operations and may allow for longer horizontal sections to be drilled. However, not all conduits can be rotated. For example, when a jointed pipe is used, the pipe may be rotated along with the bit, and the friction resisting movement of the pipe along the borehole may be decreased. However, when coiled tubing is used, the coiled tubing cannot be rotated, and the friction resisting movement of the tubing along the borehole may be increased. Further, even when using jointed pipes, wells with directional changes resulting in "doglegs" or a crooked borehole, may restrict the amount of rotation that may be used. Moreover, when using these physical methods to reduce friction, friction may continue to build as the borehole is drilled, and the conduit is inserted deeper. Thus, eventually enough friction may be present to prevent further insertion or extraction of a conduit from the borehole. This effectively means that drilling rigs may sometimes drill longer horizontal sections than completion equipment can complete.

Friction reducers have proven effective in reducing the coefficient of friction between two metal substrates. Some examples may include the deposition of polymer particles onto a metal substrate. In these examples, the oil must have a charge association. However, this approach may be ineffective when there are not two metal substrates present to provide the deposition sites, or when fluid conditions, such as the fluid pH, change when in use, and these changed fluid conditions alter the charge association and prevent film buildup or transport of the friction reducers.

Consequently, there is a need for an organic nonhazardous biodegradable friction reducer that is not charge specific, does not require mechanical deposition to reduce the coefficient of friction, is usable between any type of media, and can function in any water condition regardless of the pH of the water or the presence of suspended or dissolved solids.

BRIEF SUMMARY

These and other needs in the art are addressed in an embodiment by a method for reducing a coefficient of friction between two surfaces in a borehole. The method includes preparing a mixture comprising a primary lubricating agent, a primary surfactant, a spreading agent, and an aqueous fluid. The method also includes pumping the mixture into the borehole such that the mixture contacts the two surfaces and reduces the coefficient of friction for the two surfaces.

These and other needs in the art are addressed in other embodiments by a pumpable friction reducing fluid composition. The composition includes a primary lubricating agent, a primary surfactant, a spreading agent, and an aqueous fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

These drawings illustrate certain aspects of some of the examples of the present method and should not be used to limit or define the method.

DETAILED DESCRIPTION

Figure 1:
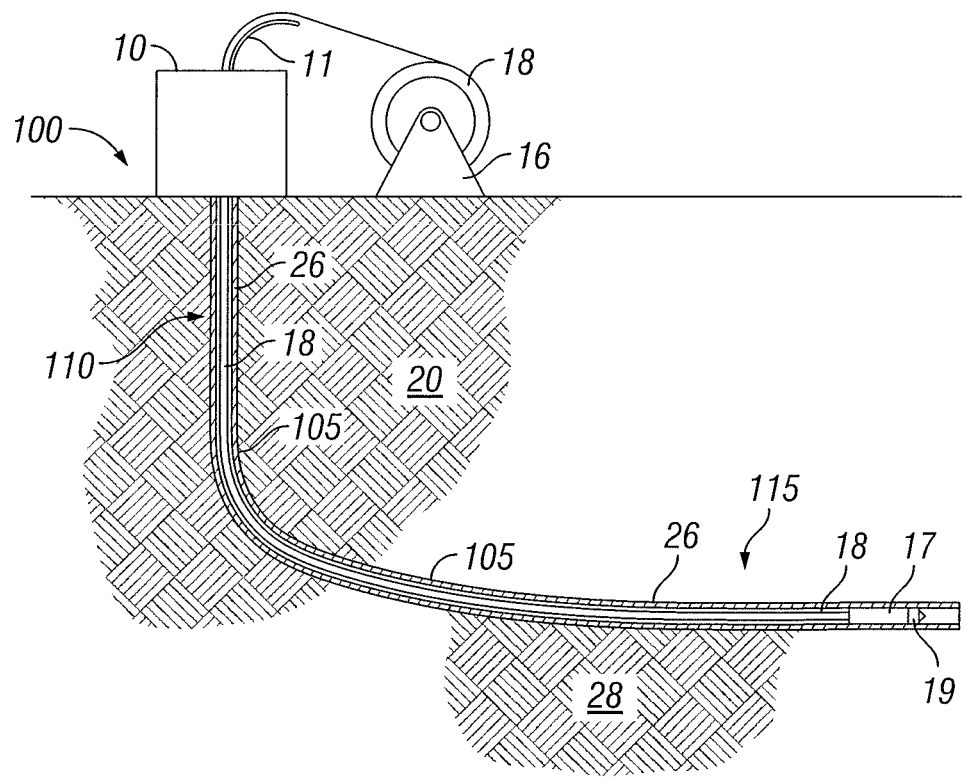
FIG. 1 is an overall view of a horizontal well configuration in accordance with present embodiments.

FIG. 1 illustrates a typical coiled tubing drilling apparatus in a horizontal well 100 having wellhead 10. Support 16 holds a reel of coiled tubing 18, which is guided over curved support 11 into the well 100. Wellhead 10 may include a blowout preventer, a snubbing mechanism, or other conventional equipment. The well 100 is cased with casing 26 that extends within the well bore 105 through formations 20 in the vertical section 110 of the well and through formation 28 in the horizontal section 115.

For certain well completion processes, such as drilling bridge plugs from casing 26, coiled tubing 18 is lowered into the well 100 and enters the horizontal section 115 of casing 26, which is normally cemented in formation 28. Turbine or motor 17 and bit 19 may be attached to the distal end of the coiled tubing 18 to drill out devices such as bridge plugs (not shown) that have been inserted into the horizontal section 115 of the casing 26. For drilling applications, a fluid is pumped through coiled tubing 18, motor 17 and bit 19 and returns to the wellhead 10 through the annulus 120 (illustrated in FIG. 2) between coiled tubing 18 and casing 26.

Figure 2:
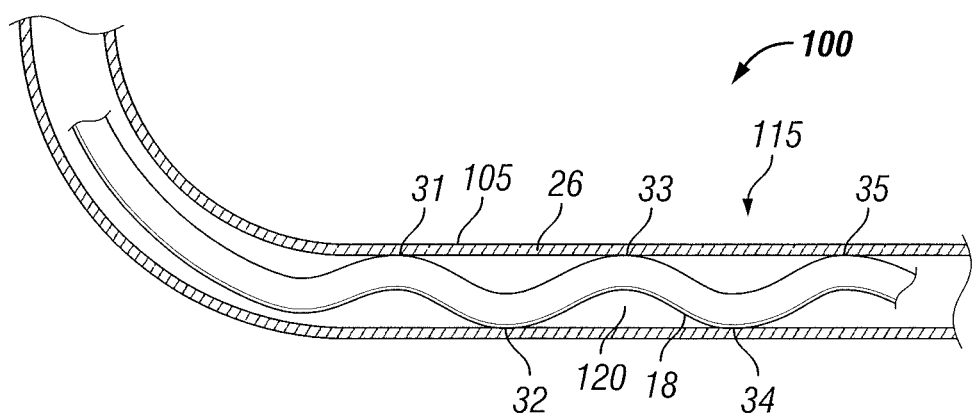
FIG. 2 is a sectional view of a horizontal portion of the horizontal well with coiled tubing located within the casing of the well in accordance with present embodiments.

As coiled tubing 18 is pushed through the horizontal section 115 of the casing 26, contact may occur at points 31-35, shown in FIG. 2. Contact at contact points 31-35 may be between any type of media including any similar or dissimilar media that may be inserted into the well 100. For example, contact may be metal-to-metal contact, plastic-to-plastic contact, metal-to-plastic contact, etc. Friction increases the force required to place the coiled tubing 18 in the well 100 and may limit the length of the coiled tubing 18 that may be placed in the horizontal section 115 of the casing 26.

In embodiments, a friction reducer may be introduced to the well 100 to reduce the friction at contact points 31-35. The friction reducer may be used to reduce the coefficient of friction between the two similar or dissimilar media which may form contact points 31-35. In embodiments, the friction reducer comprises a primary lubricating agent. The primary lubricating agent comprises a tall oil fatty acid, a tallow oil fatty acid, or a combination thereof. Tall oil fatty acids as defined herein, are any fatty acid produced via the Kraft process of wood pulp manufacture. One of ordinary skill in the art would understand the Kraft process which generally involves treatment of wood chips with a mixture of sodium hydroxide and sodium sulfide that breaks the bonds that link lignin to the cellulose. In some embodiments, the tall oil fatty acid may have a partially unsaturated C18 backbone. Examples of a tall oil fatty acid include, but are not limited to palmitic acid, palmitoleic acid, stearic acid, oleic acid, linoleic acid, or a combination thereof. Tallow oil fatty acids as defined herein, are any fatty acid produced from rendering beef or mutton fat. One of ordinary skill in the art would understand that rendering beef or mutton fat generally involves a batch or a continuous process in which an amount of tissue material is heated in a steam-jacketed vessel to drive off the moisture and simultaneously release the fat from the fat cells. Examples of a tallow oil fatty acid include, but are not limited to palmitic acid, palmitoleic acid, stearic acid, myristic acid, oleic acid, linoleic acid, linolenic acid, or a combination thereof. The tall oil fatty acid or tallow oil fatty acid may be used in a crude or refined form. The friction reducer may also comprise optional additional lubricating agents, for example, secondary or tertiary lubricating agents. The optional additional lubricating agents may comprise one of the example primary lubricating agents discussed above, or may comprise a lubricating agent that is not a tall oil fatty acid, a tallow oil fatty acid, or a combination thereof.

In embodiments, the friction reducer comprises a primary surfactant. The primary surfactant comprises a nonionic polyethylene glycol surfactant with a hydrophile/lipophile balance between 9 to 14 and a molecular weight in a range of about 200 to about 600. Suitable examples include, but are not limited to poly(ethylene glycol) monooleate, poly(ethylene glycol) dioleate, poly(ethylene glycol) monolaurate, poly(ethylene glycol) dilaurate, or a combination thereof.

In embodiments, the friction reducer comprises a spreading agent. The spreading agent comprises a transesterified lipid. Suitable examples include, but are not limited to methyl canolate, methyl caprate, methyl caprylate, methyl coconate, methyl lardate, methyl laurate, methyl myristate, methyl oleate, methyl palm kernelate, methyl palmitate, methyl soyate, methyl stearate, methyl tallowate, or a combination thereof. In embodiments, the friction reducer may comprise the spreading agent in a 4:1 to 1:4 ratio by weight percent with the primary lubricating agent. For example, the ratio of the spreading agent to the primary lubricating agent may be about 4:1 by weight percent, about 3:1 by weight percent, about 2:1 by weight percent, about 1:1 by weight percent, about 1:2 by weight percent, about 1:3 by weight percent, about 1:4 by weight percent, and so on. In a specific embodiment, the spreading agent may be present in the friction reducer in a 1:1 ratio with the primary lubricating agent.

In optional embodiments, the friction reducer may comprise a secondary surfactant. The secondary surfactant comprises a nonionic alkanolamide family member that is a reaction product of diethanolamine and a fatty acid. In optional embodiments, the secondary surfactant has a hydrophile/lipophile balance between 9 to 14 and a molecular weight in a range of about 200 to about 600. Suitable examples include, but are not limited to cocamide diethanolamine, lauramide diethanolamine, oleamide diethanolamine, a soyamide diethanolamine, lauric acid diethanolamine, oleic acid diethanolamine, or a combination thereof. Where present, the friction reducer may comprise the secondary surfactant in a 4:1 to 1:4 ratio by weight percent with the primary surfactant. For example, the ratio of the secondary surfactant to the primary surfactant may be about 4:1 by weight percent, about 3:1 by weight percent, about 2:1 by weight percent, about 1:1 by weight percent, about 1:2 by weight percent, about 1:3 by weight percent, about 1:4 by weight percent, and so on. In a specific embodiment, the secondary surfactant may be present in the friction reducer in a 1:1 ratio with the primary surfactant.

In embodiments, the aqueous fluid may be added to the friction reducer prior to pumping the friction reducer into a borehole. The aqueous fluid may be from any source. The aqueous fluid may comprise fresh water or salt water. Salt water generally may include one or more dissolved salts therein and may be saturated or unsaturated as desired for a particular application. Seawater or brines may be suitable for use in some applications. The aqueous fluid may comprise any amount of dissolved solids and/or suspended solids. The dissolved solids and/or suspended solids may be from any source. The aqueous fluid may comprise any pH, for example, the aqueous fluid may comprise a pH of about 1 to about 14. Further, the aqueous fluid may be present in an amount sufficient to form a pumpable fluid. In certain embodiments, the aqueous fluid may be present in an amount in the range of from about 33% to about 200% by weight of the friction reducer. In certain embodiments, the aqueous fluid may be present in an amount in the range of from about 35% to about 70% by weight of the friction reducer. With the benefit of this disclosure one of ordinary skill in the art should recognize the appropriate amount of aqueous fluid for a chosen application.

The components of the friction reducer may be added to the aqueous fluid in any order. Further, two or more of the components of the friction reducer may be mixed before adding the aqueous fluid. The components of the friction reducer may be mixed in any order, for example the primary lubricating agent may be mixed with the primary surfactant. The spreading agent may then be added to and mixed with this mixture. The aqueous fluid may then be added to that mixture of the primary lubricating agent, primary surfactant, and the spreading agent to form an unstable oil-in-water emulsion. As an alternative example, the primary surfactant may be added to the aqueous fluid and mixed. To this mixture, the primary lubricating agent and the spreading agent may be added and mixed to form an unstable oil-in-water emulsion where the primary lubricating agent comprises the dispersed phase, and the aqueous fluid comprises the continuous phase. Without limitation by theory, it is believed that not fully emulsifying the primary lubricating agent may be important for achieving deposition of the micelles formed from the primary lubricating agent on a surface to be lubricated, as discussed in more detail below.

Without limitation by theory, it is believed that the non-ionic nature of the surfactants allows the friction reducer to be used in a wide range of aqueous fluid conditions including fresh water sources such as municipal water supplies to rivers or lakes or heavily weighted brine and water containing high levels of total dissolved solids and/or total suspended solids. Moreover, it is believed that the hydrophile/lipophile balance of 9 to 14 allows for the formation of suspended microscopic micelles of the primary lubricating agent. In effect, the primary lubricating agent is evenly dispersed throughout the aqueous fluid in the friction reducer, without being fully emulsified. The even dispersal of the primary lubricating agent also allows for an even deposition of the primary lubricating agent within the casing 26, formations 20 and 28, coiled tubing 18, or any other surface in which the friction reducer contacts. The spreading agent may be used to increase micelle mobility throughout the aqueous fluid. The micelles comprise polar hydrophilic heads and long hydrophobic tails. The balance of the hydrophilic heads to the hydrophobic tails is precisely governed by the hydrophile/lipophile balance of the primary surfactant and, if present, the secondary surfactant. As explained below, a hydrophobic tail of the primary lubricating agent contained within a micelle may be linked or branched to a hydrophobic tail of another primary lubricating agent as well as the hydrophobic tails of the primary surfactant and, if present, the secondary surfactant.

Figure 3:
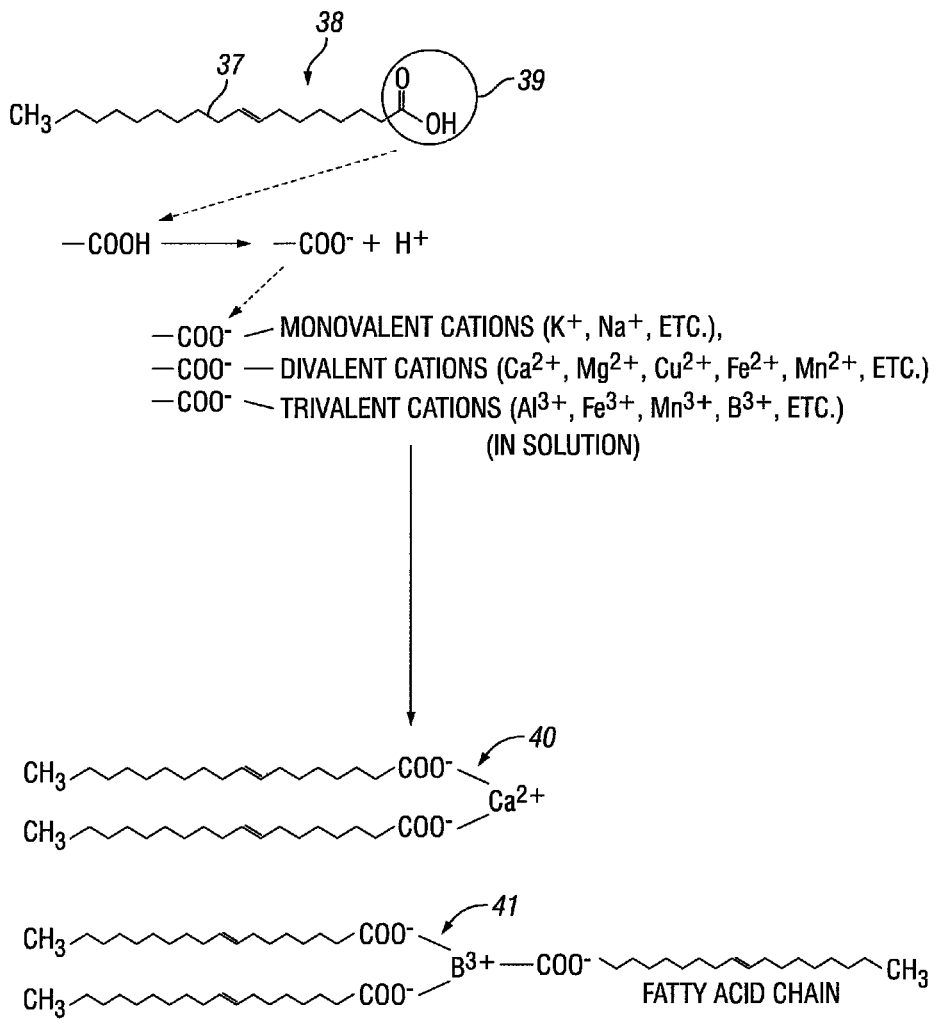
FIG. 3 is an overview of the process of linking of a hydrophobic tail of a lubricating agent with the hydrophobic tail of another lubricating agent in accordance with present embodiments.

The nonionic characteristics of the primary and secondary surfactants allow the friction reducer to be used in a wide range of aqueous fluid types, including those with high levels of dissolved solids and/or high levels of suspended solids, with no perceptible negative effect on performance. In some examples, the measured coefficient of friction values have been shown to improve when used in an aqueous fluid comprising elevated levels of dissolved solids. As mentioned above, certain types of dissolved solids may allow for the crosslinking of the COOH group of the hydrophobic tail with divalent (e.g., $Ca^{2+}$, $Mg^{2+}$, $Cu^{2+}$, $Fe^{2+}$, $Mn^{2+}$, etc.) and trivalent ($Al^{3+}$, $Fe^{3+}$, $Mn^{3+}$, $B^{3+}$, etc.) cations present within the aqueous fluid. FIG. 3 illustrates the linking of the hydrophobic tail 37 of a molecule of a primary lubricating agent 38 with the hydrophobic tail 37 of another molecule of a primary lubricating agent 38. Upon introduction into the aqueous fluid, the hydrophilic head 39 of the molecule of primary lubricating agent 38 dissociates and loses a hydrogen, leaving a corresponding COO— group. Free divalent and trivalent cations may then act as a bridge linking the COO— groups from other molecules of primary lubricating agent 38 and also any compatible primary and, optionally, secondary surfactants with COO— (or other anionic) groups present. Molecule 40 is an example of two molecules of primary lubricating agent 38 linked by a divalent cation. Molecule 41 is an example of three molecules of primary lubricating agent 38 linked by a trivalent cation. This process may increase the amount of hydrophobic tails per molecule of primary lubricating agent 38, which may in turn provide a stronger and more robust lubricating boundary layer between any similar or dissimilar media. It is to be understood that the more impurities that are present the stronger and more ridged the micelles can become due to the linking of the hydrophobic tails of the primary lubricating agent. Without the use of nonionic surfactants with the properties disclosed herein, organized micelle formation may not occur, and hydrophobic tail linking may not occur.

The cohesive force that promotes deposition of the micelles on a media's surface is due to the inherent nature of the hydrophobic tales migrating to and attaching to any available surface within the aqueous fluid body. The hydrophobic tales may then orientate themselves and attach at an angle (e.g., a 90° angle) relative to the surface, with the subsequent deformation of the spherical shape of the micelle, such that the micelle may break apart as the hydrophobic tales attach to the surface, leaving the hydrophilic heads facing the aqueous fluid body. The deposited micelles create an extremely tenacious boundary layer between any of the surfaces they contact, and this boundary layer may significantly lower the coefficient of friction between two surfaces. Ultimately, this method may allow an operator to convey a work string (e.g., coiled tubing 18 as shown in FIGS. 1 and 2) within the borehole with much less required energy. This may in turn lessen the chance of sticking and greatly improve the overall efficiency of a drilling operation.

This organic mixture has proven to be much more effective than conventional chemistry in horizontal oil and gas well drilling and completion operations. Tests have been performed on an oil and gas well, and the rotational torque and weight of the pipe were compared to conventional chemistry. The mixture showed a twofold improvement in friction with one third of the volumetric dosage rates. This improved performance at lower dosage rates is substantial in reducing the overall carbon footprint associated with the manufacturing, transportation, storage and application of these chemicals. It should also be noted that during these tests, water that had been produced from an oil and gas well and containing high levels of suspended and dissolved solids, that would have normally been injection into disposal wells was used as the aqueous solution in which the mixture was applied into. This mixture has proven effective not only in very turbid fluid conditions but within a wide range of PH conditions.

The media lubricated by the friction reducer may be any such media as desired, including similar (i.e. the same types of media) or dissimilar (i.e. different types of media). Without limitation, the media may comprise metal (e.g., iron, steel, copper, aluminum, etc.); plastic (polypropylene, polyethylene, polyvinyl chloride, etc.); any and all types of rock (e.g., shale) which may occur in a formation (e.g., formations 20 and 28 as illustrated on FIG. 1); wood; composites thereof; or combinations thereof. In embodiments, the friction reducer may be used to lower the coefficient of friction of the two media. Without limitation by theory, this is believed to occur, because the friction reducer may form a boundary layer between the surfaces of the two media, such that the amount of contact between the surfaces of the two media is reduced. For example, the friction reducer may be used to lower the coefficient of friction between a metal and a rock. As another example, the friction reducer may be used to reduce the coefficient of friction between a plastic and a metal.

In embodiments, the friction reducer may be non-toxic at the concentrations used in the disclosed examples. Non-toxic is defined herein as a product that does not produce immediate personal injury or illness to humans when it is inhaled, swallowed, or absorbed through the skin. As such, the friction reducer may be prepared for use with a reduced risk to personnel as compared to the use of toxic friction reducing compositions. The friction reducer may be biodegradable at the concentrations used in the disclosed examples. Biodegradable is defined herein as any material which is capable of degradation by a microorganism or through any other biological means. The friction reducer may biodegrade at varying rates dependent upon the species of lubricating agent, surfactant, and spreading agent chosen, as well as the conditions present to induce biodegradation. Thus, the friction reducer may be placed and/or disposed on the surface or within a borehole, with a reduced risk of forming a permanent deposit of the friction reducer on the surface, on equipment, or otherwise within the borehole. The friction reducer may be biocompatible at the concentrations used in the disclosed examples. Biocompatible is defined herein as the ability to be in contact with a living system (e.g., plants, animals, etc.) without producing an adverse effect. The friction reducer may contact living systems without risk of damaging those systems and may therefore be used in operations and/or at concentrations in which other friction reducers may not be used. For example, the friction reducer may be used in operations where the risk of and the potential damage caused by pollution may be elevated.

EXAMPLES

To facilitate a better understanding of the present claims, the following examples of certain aspects of the disclosure are given. In no way should the following examples be read to limit, or define, the entire scope of the claims.

Example 1

Figure 4:
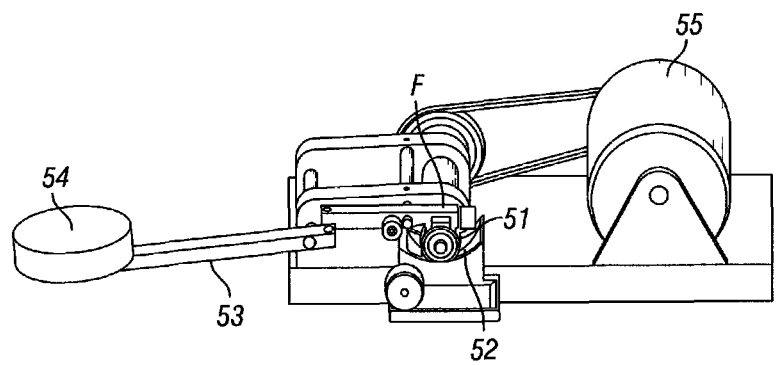
FIG. 4 is a perspective view of the friction-testing device used to test fluids in accordance with present embodiments.

An illustration of a device used to evaluate the performance of the friction reducer disclosed herein is shown in FIG. 4. This bench-top friction tester is manufactured by JUSTICE BROS.®, and is intended for evaluating the performance of lube oil additives. JUSTICE BROS.® is a registered trademark of Justice Brothers, Inc. of Duarte, Calif. Force F of a metal bar is applied to rotating metal bearing surface 51. Cup 52 surrounding the bottom quarter of the rotating bearing surface provides a reservoir to hold the fluid being tested. Force F is applied to lever 53 by placing weight 54 on one end of the lever. A 1-pound weight applies a force of 100 psi to the bearing surface. The performance of the fluids is measured by observing the amperage draw of 110 volt one-quarter HP motor 55 used to rotate the bearing with a constant force on the bearing. Amperage is recorded in 5-second intervals. The testing is complete when galling of the bearing surface is heard or current drawn by the motor reaches 10 amps.

A 200 gram sample was prepared by mixing a 0.5% solution of the composition given in Table 1 into distilled water and mixing in a 200 mL beaker with magnetic stirring for 3 minutes.

TABLE 1

| Component | Amount by weight |
| --- | --- |
| Hydrocarbon oil | 91.2% |
| Ethylene bis-amide | 5% |
| Polyethylene Glycol 600 dioleate tallate | 2% |
| TEFLON ® Particles | 1.8% |

The sample was then quickly poured into cup 52 (FIG. 4). While holding the weight off the static bearing surface, the unit was turned on to allow the solution to coat the bearing surface. After a brief time, arm 53 was lowered to apply a force of 200 pounds on the bearing surfaces, and the timer was started. After completion of a test, the cup was removed from the tester and cleaned with isopropyl alcohol. The bearing surfaces were removed and replaced with new ones. Tests were performed with the mixture of Example 1 and with other fluids.

Figure 5:
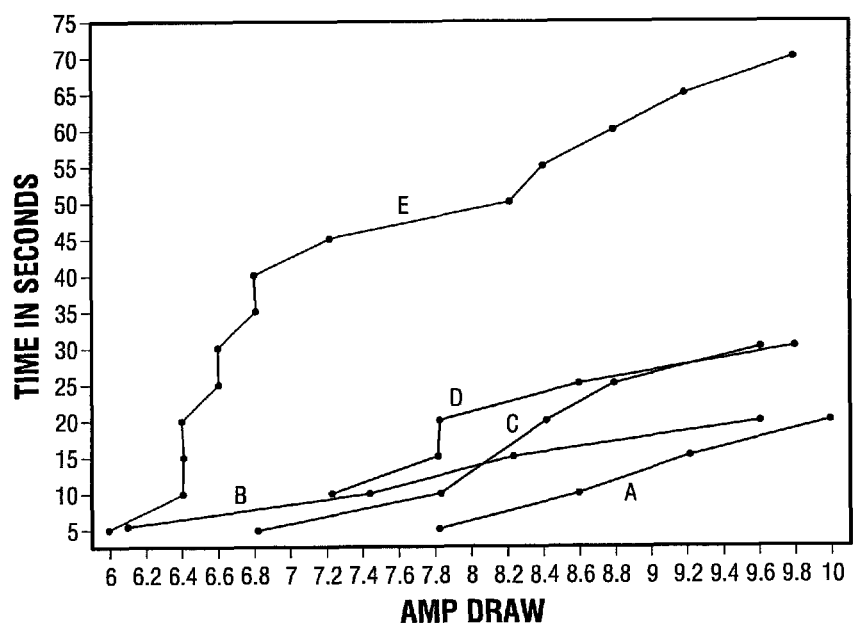
FIG. 5 is a graph of the results of tests using the test apparatus of FIG. 4 in accordance with embodiments.

FIG. 5 is a graph showing the amperage drawn by the motor over a period of time with different fluids in the test apparatus illustrated in FIG. 4. Lines A, C, and D, represent results for products presently used for completions in the oil and gas industry. In a non-limiting example, the products presently used for completions represented by lines A, C, and D may include, FRAQ SLIQ 1911 and FRAQ SLIQ 3006 produced by Rockwater Energy Solutions, ForceGlide produced by Force Chem Technologies, Slick Frog FR and Salty Frog FR produced by Greenwell Energy Solutions, and HE® 150 Polymer and LIQUID HE® 150 Polymer produced by Chevron Phillips Chemical Company and the like. HE® is a registered trademark of Chevron Phillips Chemical Company LP. Line B represents results for a mixture of TEFLON® and water. TEFLON® is a registered trademark of the Chemours Company FC, LLC of Wilmington, Del. Line E represents results for the composition of Example 1.

The graph clearly indicates that products A-D resulted in an amperage draw approaching 10 in a much shorter time period than that of the composition disclosed above and in Example 1. Compositions A-D led to currents approaching 10 amps in 20-30 seconds, whereas the formulation disclosed here led to currents approaching 10 amps after 70 seconds.

Example 2

A well operator had set 10 bridge plugs inside casing in the horizontal section of a well in Texas. Operations to drill the bridge plugs were conducted using coiled tubing. The well had a vertical depth of about 8,290 ft and had a measured depth of about 13,220 ft. Coiled tubing had been used to drill all plugs but the bottom two plugs. Using a conventional friction reducing fluid, friction limited the ability to drill the last two plugs. The decision was made to try the oil phase composition disclosed herein. After adding the oil phase mixture disclosed in Example 1 to water at rates of 1 or 2 gals per 10 bbls and circulating the present fluid up the annulus outside the coiled tubing, the final two plugs were reached and drilled. In a second well drilled from the same pad as the first well, friction was higher than in the first, but all the plugs were successfully drilled from the well using the composition disclosed herein. The representative of the well operator who was present during the drilling operations commented that he did not believe all the plugs could have been drilled without the use of the materials disclosed herein.

The concentrations given in Example 1 may be varied over a broad range. The concentration of TEFLON® particles may range from about 1% by weight to about 8% by weight. The concentration of ethylene bis-amide may vary from about 1% to about 10%. Tests can be used to determine an effective amount of suspending agent. The concentration of surfactant may range from about 1% to about 5%. Tests such as described above can be used to determine an effective amount of surfactant.

The formulation of the present invention has also been found to inhibit corrosion on metal surfaces. Pieces of ¼-in plate were cut into 2-in×5-in strips and their surface ground to bare metal. Two were used as a control and not coated with anything. One strip was sprayed with a 10 lb/gal brine and one was not. Both were set outside in atmospheric conditions. Two of the strips were treated with a solution of polyacrylamide in water, which is the composition of fluids used in many completion, workover and fracturing operations. One of these was sprayed with a 10 lb/gal brine and one was not. Both were set outside in atmospheric conditions. The other two strips were treated with oil containing the surfactant TEFLON® as disclosed herein. One was then sprayed with brine and one was not. Both were put outside in atmospheric conditions. After five days in atmospheric conditions, the strips treated with the oil containing surfactant and TEFLON® disclosed herein showed corrosion (rust) on less than 15% of the surface, while the other samples had rust on 100% of the surface area. The samples treated with the polyacrylamide fluid showed no better corrosion resistance than the control plates that had no treatment. Surface rust for the control plate treated with the 10 lb/gal brine was noticeably thicker than the one that was not sprayed. This held true for both the control plate and the one treated with polyacrylamide. The surface area for both the control plates and those treated with polyacrylamide had rust on 100% of the surface area.

The corrosion tests show that the fluid disclosed herein provides corrosion protection to steel surfaces in a well after contact with the fluid. This means that the oil, surfactant friction reducer containing TEFLON® can be pumped on an intermittent basis to provide corrosion protection and friction reduction on the surfaces of tubulars in a well.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method for reducing a coefficient of friction between two surfaces in a borehole, the method comprising:
    (A) preparing a mixture comprising a primary lubricating agent, a non-ionic primary surfactant, a spreading agent, and an aqueous fluid, wherein the mixture is in a form of an emulsion wherein the primary lubricating agent comprises a dispersed phase within the emulsion and the aqueous fluid comprises a continuous phase, wherein the non-ionic primary surfactant comprises a non-ionic polyethylene glycol, wherein the non-ionic primary surfactant comprises a hydrophile/lipophile balance between 9 to 14; and
    (B) circulating the mixture through a tubular disposed in the borehole such that the mixture contacts the two surfaces and reduces the coefficient of friction between the two surfaces.

2. The method of claim 1, wherein the primary lubricating agent comprises a tall oil fatty acid, a tallow fatty acid, or a combination thereof.

3. The method of claim 1, wherein the primary lubricating agent comprises palmitic acid, palmitoleic acid, stearic acid, oleic acid, linoleic acid, myristic acid, linolenic acid, or a combination thereof.

4. The method of claim 1, wherein the non-ionic primary surfactant has a molecular weight in a range of about 200 to about 600.

5. The method of claim 1, wherein the non-ionic polyethylene glycol is a poly(ethylene glycol) monooleate, poly(ethylene glycol) dioleate, poly(ethylene glycol) monolaurate, poly(ethylene glycol) dilaurate, or combination thereof.

6. The method of claim 1, wherein the spreading agent comprises a transesterified lipid.

7. The method of claim 1, wherein the spreading agent comprises methyl canolate, methyl caprate, methyl caprylate, methyl coconate, methyl lardate, methyl laurate, methyl myristate, methyl oleate, methyl palm kernelate, methyl palmitate, methyl soyate, methyl stearate, methyl tallowate, or a combination thereof.

8. The method of claim 1, further comprising a secondary surfactant.

9. The method of claim 8, wherein the secondary surfactant comprises a nonionic surfactant comprising a hydrophile/lipophile balance between 9 to 14 and a molecular weight in a range of about 200 to about 600.

10. The method of claim 8, wherein the secondary surfactant comprises cocamide diethanolamine, lauramide diethanolamine, oleamide diethanolamine, a soyamide diethanolamine, lauric acid diethanolamine, oleic acid diethanolamine, or a combination thereof.

11. The method of claim 1, wherein the aqueous fluid has a pH between about 1 to about 14.

12. The method of claim 1, wherein one of the two surfaces comprises metal and the other of the two surfaces comprises rock.

13. The method of claim 1, wherein the primary lubricating agent comprises a tallow oil fatty acid.

14. The method of claim 1, wherein the primary lubricating agent comprises a fatty acid.

15. The method of claim 14, wherein the fatty acid is produced via a kraft process of wood pulp manufacture.

16. The method of claim 1, wherein the primary lubricating agent is evenly dispersed throughout the aqueous fluid in the mixture.

* * * * *